(12) United States Patent
Phillips et al.

(10) Patent No.: US 12,547,950 B2
(45) Date of Patent: Feb. 10, 2026

(54) SECURE TICKETING PLATFORM AND RELATED METHODS

(71) Applicants: Frank Joseph Phillips, Cincinnati, OH (US); Elijah Jackson Sirota, Boca Raton, FL (US); Blaine Andrew Ledbetter, Carmel, IN (US)

(72) Inventors: Frank Joseph Phillips, Cincinnati, OH (US); Elijah Jackson Sirota, Boca Raton, FL (US); Blaine Andrew Ledbetter, Carmel, IN (US)

( * ) Notice: Subject to any disclaimer, the term of this patent is extended or adjusted under 35 U.S.C. 154(b) by 0 days.

(21) Appl. No.: 18/794,398

(22) Filed: Aug. 5, 2024

(65) Prior Publication Data

US 2025/0045647 A1     Feb. 6, 2025

Related U.S. Application Data

(60) Provisional application No. 63/655,705, filed on Jun. 4, 2024, provisional application No. 63/530,950, filed on Aug. 4, 2023.

(51) Int. Cl.
| | |
|---|---|
| *G06Q 10/00* | (2023.01) |
| *G06F 21/10* | (2013.01) |
| *G06Q 10/02* | (2012.01) |
| *G06Q 30/018* | (2023.01) |
| *G06Q 30/0601* | (2023.01) |
| *H04L 9/32* | (2006.01) |

(52) U.S. Cl.
CPC ......... *G06Q 10/02* (2013.01); *G06F 21/1014* (2023.08); *G06Q 30/0185* (2013.01); *G06Q 30/0609* (2013.01); *H04L 9/3273* (2013.01)

(58) Field of Classification Search
None
See application file for complete search history.

(56) References Cited

U.S. PATENT DOCUMENTS

| | | | |
|---|---|---|---|
| 10,193,695 B1 * | 1/2019 | Endress | G06F 18/214 |
| 2019/0114182 A1 * | 4/2019 | Chalakudi | H04L 63/0442 |
| 2022/0122072 A1 | 4/2022 | Kang et al. | |
| 2022/0198418 A1 | 6/2022 | Kang et al. | |
| 2023/0122552 A1 * | 4/2023 | Meyers | A63F 13/792 |
| | | | 463/29 |
| 2023/0123993 A1 * | 4/2023 | Meyers | H04L 9/3213 |
| | | | 705/69 |
| 2023/0360029 A1 * | 11/2023 | Pranger | G06Q 20/10 |

FOREIGN PATENT DOCUMENTS

| | | | | |
|---|---|---|---|---|
| WO | WO-2024025863 A1 * | 2/2024 | | G06Q 10/04 |
| WO | WO-2024059758 A1 * | 3/2024 | | G06Q 20/401 |

* cited by examiner

*Primary Examiner* — Tonya Joseph
(74) *Attorney, Agent, or Firm* — JWIP & Patent Services, LLC; Jacob G. Weintraub, Esq.

(57) ABSTRACT

The present invention is directed to improved secure ticketing methods, APIs, and platforms that address duplicative fraudulent tickets and concurrently afford dynamic features that can offer restrictions and benefits to the secure tickets. In certain embodiments of the present invention, the secure ticketing methods, APIs and platforms are scalable, consistent, and efficient. Moreover, the secure ticketing methods, APIs, and platforms dynamically offer assignable immersive experiences upon ticket scanning, creating digital memorabilia and other real-world experiences. In certain embodiments the secure ticketing methods, APIs, and platforms afford a solution for addressing price inflation created by ticket purchasing bots.

21 Claims, 1 Drawing Sheet

SECURE TICKETING PLATFORM AND RELATED METHODS

RELATED APPLICATIONS

This application is related to U.S. Provisional Patent Application No. 63/530,950, filed on Aug. 4, 2023 and U.S. Provisional Patent Application No. 63/655,705, filed on Jun. 4, 2024; the entirety of each of which is incorporated herein by reference.

BACKGROUND OF THE INVENTION

Fraudulent ticketing complaints have skyrocketed in the last several years, and with more than 94 million people expected to attend just music events this year, over 11 million of these consumers are likely to face ticketing scams. In an effort to prevent ticketing fraud, the industry has been switching to digital-only tickets. Although ticket scams have been a problem for years, this recent trend of incorporating digital technology in ticket issuance has unfortunately made it more difficult than ever to spot fake tickets or detect a scam. In this respect, forging tickets has actually been made easier through the technique of duplication of digital ticket barcodes and QR codes of actual tickets derived from legitimate sources.

Although reputable ticket sellers and re-sellers have identifiable credentials and official websites, scam artists and fraudsters have established similar looking websites, and rely on desperate purchasers in rushed circumstances. Many event attendants who purchase the fraudulent tickets do not find out that they have been scammed until they show up at the venue and cannot get access to the event. Although some discover they purchased counterfeit tickets, others have legitimate tickets that the scammers duplicate and sell to multiple people. In the latter scenario, the first event attendant who has their ticket scanned at the gate gets in, but the others do not.

The unrestricted nature of digital tickets limits the interaction of the event host with the ticket consumer solely to the purchase transaction, leaving the event host without having the ability to interact with the event attendant after this purchase interaction. Beyond leaving an important marketing opportunity on the table, this has the unintended consequence of creating another hurdle for event hosts resulting from ticket-buying bots that collect large quantities of tickets before real consumers can purchase them; which results in tickets selling out quickly, and then subsequently being re-sold at very high prices in a price-inflated secondary market, reaching levels which the artist and the event host never intended. This, in turn, feeds the fraudulent market with desperate consumers, primed for fraudulent tickets.

Solutions for fraudulent ticket sales have evolved as the technology has evolved. From limiting barcode visibility until certain windows of time closer to the event, to even recently requiring approximate location to a specific scanner type; however, these existing solutions fail to address the sale of real tickets, multiple times, and do nothing to add functional restrictions or benefits to enhance the event attendant experience, nor prevent the creation of fraud primed markets by bot purchase and price inflation.

As such, there remains a need for improved secure ticketing platforms that address duplicative fraudulent tickets and concurrently afford dynamic features that can offer restrictions and benefits to the secure tickets. There is also a need that such secure ticketing platforms are scalable, consistent, and efficient.

SUMMARY OF THE INVENTION

Accordingly, the present invention is directed to improved secure ticketing methods, APIs, and platforms that address duplicative fraudulent tickets and concurrently afford dynamic features that can offer restrictions and benefits to the secure tickets. In certain embodiments of the present invention, the secure ticketing methods, APIs and platforms are scalable, consistent, and efficient. Moreover, the secure ticketing methods, APIs, and platforms dynamically offer assignable immersive experiences upon ticket scanning, creating digital memorabilia and other real-world experiences. In certain embodiments the secure ticketing methods, APIs, and platforms afford a solution for addressing price inflation created by ticket purchasing bots.

As such, one aspect of the present invention provides a secure ticketing platform for an event host to issue a plurality of privacy restricted non-fungible tokens (pr-NFT) comprising:
   a blockchain wallet of an event host;
   a blockchain wallet of an event attendant;
   a de-centralized application with an API suitable for interfacing with a plurality of device nodes structured as a blockchain network, wherein the application comprises a machine-readable medium having instructions stored thereon for execution by a processor to perform a method comprising the steps of:
   accessing a plurality of device nodes structured as a blockchain network;
   creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;
   transferring the pr-NFT to the blockchain wallet of the event attendant (e.g., from a blockchain wallet of the event host);
   unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);
   authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;
   authorizing access to the event; and
   updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred,
such that the plurality of the pr-NFTs serve as secure tickets for the event.

Another aspect of the present invention provides a secure ticketing API of a de-centralized application for an event host to issue a plurality of privacy restricted non-fungible tokens (pr-NFT) suitable for interfacing with a plurality of device nodes structured as a blockchain network, wherein the application comprises a machine-readable medium having instructions stored thereon for execution by a processor to perform a method comprising the steps of:

accessing a plurality of device nodes structured as a blockchain network;
  creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;
  transferring the pr-NFT to a blockchain wallet of the event attendant (e.g., from a blockchain wallet of the event host);
  unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);
  authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;
  authorizing access to the event; and
  updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

Another aspect of the present invention provides a method of secure ticketing for an event host to issue a plurality of privacy restricted non-fungible tokens (pr-NFT) comprising the steps of:

accessing a plurality of device nodes structured as a blockchain network;
  creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;
  transferring the pr-NFT to a blockchain wallet of the event attendant (e.g., from a blockchain wallet of the event host);
  unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);
  authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;
  authorizing access to the event; and
  updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

BRIEF DESCRIPTION OF THE FIGURES

Advantages of the present secure ticketing platforms, secure ticketing API and related methods, will be apparent from the following detailed description, which description should be considered in combination with the accompanying figure, which is not intended to limit the scope of the invention in any way.

DETAILED DESCRIPTION OF THE INVENTION

The present invention is directed to improved secure ticketing methods, APIs, and platforms that address duplicative fraudulent tickets and concurrently afford dynamic features that can offer restrictions and benefits to the secure tickets. The present invention provides for the automation of the management of smart contracts (e.g., ERC-721 smart contracts) that are used to mint and validate privacy restricted non-fungible tokens (pr-NFTs) on a blockchain network (e.g., Ethereum blockchain), and which mask the barcode identifier and serve as secure tickets to avoid duplication of tickets. Automating the smart contract management serves to make the methods, API and platforms for secure ticketing more efficient, consistent, flexible, scalable, and cost-effective. Moreover, automated management of the smart contracts may result in faster processing times, reduced latency, improved error handling, and the ability to handle larger volumes of transactions.

The methods, APIs and platforms of the present invention are suitable for executing token transfers, token creation, token updates, smart contract interactions, and token management. These transactions function to create the pr-NFTs of the present invention for an event host under a smart contract, each of which serve as a secure ticket on the blockchain, and validate these pr-NFTs on the blockchain network. Such pr-NFTs can be transferred to an event attendant (purchaser) upon purchase by the event attendant. Each pr-NFT is assigned a barcode identifier that is masked until a certain trigger event, e.g., a time or location, triggers its unmasking. The barcode identifier is then scanned resulting in updates to the pr-NFT metadata of the smart contract on status/authentication, and then activation of certain assigned immersive experiences. In particular, the secure ticketing methods, APIs, and platforms dynamically offer assignable immersive experiences upon ticket scanning, creating digital memorabilia and other real-world experiences. Moreover, the smart contract of the privacy restricted NFTs offer the event host the ability to reveal the digital artwork of the privacy restricted NFT to the event attendant upon scanning of the unmasked barcode identifier (i.e., in a scan-to-reveal step) and to reflect the status in the smart contract metadata of the privacy restricted NFT that scanning of the revealed barcode identifier and authentication of the pr-NFT have occurred In certain embodiments, these secure tickets offer a solution for addressing price inflation created by ticket purchasing bots, given that the smart contracts of the privacy restricted NFTs afford the event hosts the ability to add limitations on selling and re-selling pricing, e.g., limiting resells to ensure buyers will only pay face value for the ticket.

The present invention, including secure ticketing platforms, secure ticketing API and related methods will be described with reference to the following definitions that, for convenience, are set forth below. Unless otherwise specified, the below terms used herein are defined as follows:

I. Definitions

As used herein, the term "a," "an," "the" and similar terms used in the context of the present invention (especially in the context of the claims) are to be construed to cover both the singular and plural unless otherwise indicated herein or clearly contradicted by the context.

The language "and/or" is used herein to mean both "and" in the conjunctive form and "or" in the disjunctive form.

As used herein, the language "application programming interface" or "API" are art-recognized, and used interchangeably, to describe a type of software interface, offering a service to other pieces of software, i.e., a way for two or more computer programs to communicate with each other. In contrast to a user interface, which connects a computer to a person, an application programming interface connects computers or pieces of software to each other. It is not intended to be used directly by a person (the end user) other than a computer programmer who is incorporating it into the software. An API is often made up of different parts which act as tools or services that are available to the programmer. A program or a programmer that uses one of these parts is said to call that portion of the API. The calls that make up the API are also known as subroutines, methods, requests, or endpoints. An API specification defines these calls, meaning that it explains how to use or implement them.

The language "barcode identifier" is art-recognized, and is used herein to describe a representative code consisting of a group of recited and variously patterned bars, spaces and numerals that is designed to be scanned and read into computer memory (i.e., machine-readable details) and that contains information (such as identification) about the object it labels. In certain embodiments, the barcode identifier is a standard barcode containing information in one direction, e.g., a horizontal direction or vertical direction. In certain embodiments, the barcode identifier is a quick response (QR) code type barcode containing information in two directions, e.g., both vertical and horizontal directions. In certain embodiments, the barcode identifier is a web3 barcode, affording access to the pr-NFTs of the present invention through the Web 3.0 platform using QR codes, and allows for deep-linking scanners to a WebVR experience and AR NFT gallery, i.e., giving instant access.

The language "blockchain" is art-recognized, and is used herein to describe a decentralized, distributed and public digital ledger that is used to record transactions across many computers so that the record cannot be altered retroactively without the alteration of all subsequent blocks and the consensus of the network. In particular, this distributed database maintains a continuously growing list of ordered records, called blocks. These blocks are linked using cryptography, i.e., encrypted. Each block contains a cryptographic hash of the previous block, a timestamp, and transaction data. The physical, electronic devices (often a computer or hard drive) that maintain copies of the blocks chained together, webbing a network together, keeping the blockchain operational, are called nodes. Blockchain nodes are network stakeholders and their devices are authorized to keep track of the distributed ledger and serve as communication hubs for various network tasks; wherein a blockchain node's primary job is to confirm the legality of each subsequent batch of network transactions, otherwise known as blocks. In addition, allocating a unique identifier to each node in the network helps to distinguish a node from other nodes easily. Moreover, several exemplary blockchain networks include, but are not limited to blockchain networks built as public, private, permissioned or built by a consortium.

The term "decentralized" is art-recognized with respect to blockchain networks and describe applications or device locations that are free from the control and interference of a single authority.

The language "event attendant" is used herein to refer to the consumer of the ticket to attend the event, and in whose wallet the secure ticket of the present invention is retained. Such consumer is considered an event attendant for as long the secure ticket of the present invention is retained in their wallet.

The language "event host" is used herein to describe a person or entity that is the sponsor, creator, or other related organizer that interacts with the methods, APIs and platforms of the present invention to create one or more secure tickets of the present invention, including, for example, concert venues, sporting venues, entertainment venues, and business meeting venues.

The term "interfacing" is art-recognized, and is used herein to describe the means of communication between two entities, for example a system/tool and user data entry. In certain embodiments, the interfacing may be bi-directional. In other embodiments, the interfacing may be uni-directional. In particular embodiments, such interfacing may be achieved through a graphical user interface.

The language "machine-readable medium" is art-recognized, and describes a medium capable of storing data in a format readable by a mechanical device (rather than by a human). Examples of machine-readable media include magnetic media such as magnetic disks, cards, tapes, and drums, punched cards and paper tapes, optical disks, barcodes, magnetic ink characters, and solid state devices such as flash-based, SSD, etc. Machine-readable medium of the present invention are non-transitory, and therefore do not include signals per se, i.e., are directed only to hardware storage medium. Common machine-readable technologies include magnetic recording, processing waveforms, and barcodes. In particular embodiments, the machine-readable device is a solid state device. Optical character recognition (OCR) can be used to enable machines to read information available to humans. Any information retrievable by any form of energy can be machine-readable. Moreover, any data stored on a machine-readable medium may be transferred by streaming over a network. In a particular embodiment, the machine readable medium is a network server disk, e.g., an internet server disk, e.g., a disk array. In specific embodiments, the machine-readable medium is more than one network The language "managing," "manage," and "management" are used here to describe the storing, interacting with, continued validation, and maintenance of the smart contracts related to the secure methods of ticketing of the present invention.

The language "non-fungible token" or "NFT" is art-recognized, and used interchangeably to describe a unique digital identifier that is recorded on a blockchain, and is used to certify ownership and authenticity. It cannot be copied, substituted, or subdivided, and the ownership of an NFT is recorded in the blockchain and can be transferred by the owner, allowing NFTs to be sold and traded. NFTs typically contain references to digital files such as artworks, photos, videos, and audio. Because NFTs are uniquely identifiable, they differ from cryptocurrencies, which are fungible.

The language "privacy restricted" as used in the language "privacy restricted non-fungible token" or "pr-NFT" comprising a "privacy restricted unique barcode identifier" is used herein to describe something, e.g., a non-fungible token with a unique barcode identifier, that is masked or hidden for privacy and security and instead depicted as another representative placeholder image or number, for a given period of time until unmasked or shown, e.g., by a trigger (e.g., geo-location or time); remaining stored in the metadata of the smart contract until unmasked. The pr-NFTs of the present invention serve as secure tickets to an event.

The language "user interface" is used herein to describe the graphical user interface (GUI), e.g., which allows a user to interface with the application programming interface (API), and enter data using interface components such as buttons, text fields, check boxes, etc.

The term "validating" is art-recognized, and is used herein to describe the act of verifying new transactions and adding them to the blockchain, which involves checking that blockchain transactions are valid according to the network's rules and ensuring that the sender has enough funds to complete the transaction.

The term "wallet" is used herein to refer to an NFT wallet, which is art-recognized, e.g., a web3 wallet.

II. Secure Ticketing of the Invention

The ticketing solutions offered by the present invention utilize minting non-fungible tokens (NFTs) on a blockchain network of devices that afford a decentralized, distributed and public digital ledger that is used to record transactions across many computers so that the record cannot be altered retroactively without the alteration of all subsequent blocks and the consensus of the network. The NFTs of the present invention are privacy restricted and mask the barcode identifier that serves as a secure ticket to avoid duplication of tickets. The privacy restricted NFTs of the present invention are created for an event host under a smart contract, and the present invention serves to manage the smart contract for scalability, consistency, and efficiency. The smart contracts of the privacy restricted NFTs afford the event hosts the ability to add limitations on selling and re-selling pricing, e.g., limiting resells to ensure buyers will only pay face value for the ticket. Moreover, the smart contract of the privacy restricted NFTs offer the event host the ability to reveal digital artwork of the privacy restricted NFT to the event attendant upon scanning of the unmasked barcode identifier assigned in the metadata of the pr-NFT upon minting through the smart contract (i.e., in a scan-to-reveal step); and to reflect the status in the smart contract metadata of the privacy restricted NFT that scanning of the revealed barcode identifier and authentication of the pr-NFT have occurred. Once a status change has occurred and the barcode identifier has been confirmed as scanned, the methods, API and platforms of the present invention result in a pr-NFT that is associated with the digital artwork, without restrictions, and which may be subsequently sold/transferred to a third party.

A. Method of Secure Ticketing of the Present Invention

As such, one embodiment of the present invention provides a method of secure ticketing for an event host to issue a plurality of privacy restricted non-fungible tokens (pr-NFT) comprising the steps of:
  accessing a plurality of device nodes structured as a blockchain network;
  creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;
  transferring the pr-NFT to a blockchain wallet of the event attendant (e.g., from a blockchain wallet of the event host);
  unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);
  authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;
  authorizing access to the event; and
  updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred,
such that the plurality of the pr-NFTs serve as secure tickets for the event.

In certain embodiments of the methods of secure ticketing of the present invention, the method further comprises the step of managing more than one smart contract (e.g., for multiple events and/or multiple event hosts).

The methods of the present invention further relate to the management of smart contracts, e.g., ERC-721 smart contracts, which greatly improve the efficiency, consistency, and scalability of the process.

In certain embodiments of the present invention, during each step the processes will be monitored, e.g., to ensure that if any error occurs, steps may be implemented to correct the error (e.g., automated or manual prompt).

i. Accessing Device Nodes Structured as Blockchain Network

The methods of secure ticketing for an event host to issue a plurality of privacy restricted non-fungible tokens (pr-NFT) comprise the step of accessing a plurality of device nodes structured as a blockchain network. In particular, the event host or an intermediary, e.g., through an API, obtains access to a network of device nodes that are chained or networked together to form a blockchain network. Such nodes, and resulting network are a qualified blockchain network, and each node is capable of confirming the legality of each subsequent batch of network transactions, otherwise known as blocks. Moreover, several exemplary blockchain networks include, but are not limited to blockchain networks built as public, private, permissioned or built by a consortium.

In certain embodiments, the access to the blockchain network is achieved through the use of coding libraries for connecting decentralized applications to the blockchain network, including sending transactions, interacting with smart contracts, getting block data, and more. In certain embodiments, the access to the blockchain network includes using web3py in python, which is a library for interacting with Ethereum blockchain and smart contracts.

ii Creating Smart Contract for Event

The methods of secure ticketing for an event host to issue a plurality of privacy restricted non-fungible tokens (pr-NFT) comprise the step of creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event. The pr-NFT remains private or masked to the event attendant, to avoid duplication techniques of scam artists, until unmasked for use by a trigger (e.g., geo-location or time); remaining stored in the metadata of the smart contract until the unmasking step.

Each new event will have a new smart contract deployed and a new amount of circulating privacy restricted non-fungible tokens (pr-NFT) (i.e., secure tickets of the present invention) depending on the event host's needs. Further, each event will have its own smart contract associated with it. Each pr-NFT, serving as a secure ticket, will have a different unique barcode identifier. The barcode image and related raw data are stored in the token's metadata upon mint.

The smart contract facilitates the validation and token, i.e., pr-NFT, minting process. In certain embodiments, during the step of creation of the smart contract, this step will be monitoring the minting and validation processes, e.g., to ensure that if any error occurs, steps may be implemented to correct the error (e.g., automated or manual prompt).

In certain embodiments of the present invention, the step of creating a smart contract for an event occurs upon payment from the blockchain wallet of the event host.

In certain embodiments of the present invention, the smart contract may be created using specifications requested by the event host. In certain embodiments, the event host specifies the amount of secure tickets or pr-NFTs to be minted, the pr-NFT value/pricing, and the digital artwork to be included in the metadata of the smart contract. In particular embodiments, the event host may specify other benefits (e.g., real-world assets/experiences) or restrictions (e.g., on selling) on the pr-NFT to be incorporated into the smart contract In certain embodiments of the present invention, the event host creates or provides the digital artwork.

In certain embodiments of the present invention, the digital artwork is a unique digital artwork.

In certain embodiments of the present invention, there will be a small, immutable user agreement within the metadata.

In certain embodiments of the methods of the present invention, the smart contract is an ERC-721 smart contract.

In certain embodiments of the present invention, the unique barcode identifier is generated and assigned to the token during the minting process.

In certain embodiments of the present invention, the data showing which barcode identifiers correspond to which event of an event host are stored on a machine-readable medium. In particular embodiments, this machine-readable medium is on the blockchain network. In alternative particular embodiments, this machine-readable medium is not on the blockchain network.

In certain embodiments of the present invention, the privacy restricted unique barcode identifier is a customized web3 barcode. In certain embodiments, the event holder may have direct input into web3 barcode creation. In particular embodiments, the event host is assigned rights to create the web3 barcode.

In certain embodiments of the present invention, the privacy restricted unique barcode identifier is masked as a graphic image until unmasked. In certain embodiments, the pr-NFT presents a public image as a placeholder graphic.

iii. Transferring pr-NFT to Blockchain Wallet of Event Attendant

The methods of secure ticketing for an event host to issue a plurality of privacy restricted non-fungible tokens (pr-NFT) comprise the step of transferring the pr-NFT to the blockchain wallet of the event attendant. Each token that was minted is capable of transfer to the event attendant (purchaser) after receipt of payment from the NFT wallet of the event attendant, e.g., the web3 wallet address containing funds (or "gas"). In certain embodiments, the pr-NFT is transferred from the wallet of the event host, e.g., which was populated by minting and validation of the tokens based on the smart contracts described herein.

In certain embodiments of the present invention, the step of the transferring the pr-NFT to the blockchain wallet of the event attendant is based on a purchase of a ticket from the blockchain wallet of an event host.

In certain embodiments of the present invention, the transfer of the pr-NFT to the blockchain wallet of the event attendant purchaser comprises the steps of: downloading a wallet application from the event attendant's device app store that supports the pr-NFTs of the present invention; the wallet is connected to the marketplace offering the pr-NFTs of the present invention; ensuring the proper gas fees to purchase the pr-NFT and/or add additional gas fees to the wallet; purchasing the pr-NFT and confirming the pr-NFT is in the wallet.

In certain alternative embodiments of the present invention, in replacement of the NFT wallet of the event host and/or the event attendant, the pr-NFTs of the present invention may also use alternative methods like the IPFS (InterPlanetary File System) to store the pr-NFTs. In particular, the IPFS stores metadata, images, and other assets off the blockchain, which can be accessed with a custom IPFS URL.

In certain embodiments of the present invention, the pr-NFT may be transferred to another event attendant (i.e., the block chain wallet of another event attendant). In particular embodiments, the price/cost/gas funds for the transfer may be limited by the event host.

iv. Unmasking Privacy Restricted Unique Barcode Identifier

The methods of secure ticketing for an event host to issue a plurality of privacy restricted non-fungible tokens (pr-NFT) comprise the step of unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant). In this step, after accessing the pr-NFT in the event attendant wallet, the pr-NFT is unmasked, and the unique barcode identifier is available for display.

In certain embodiments of the present invention, the step of unmasking the privacy restricted unique barcode identifier of the pr-NFT to reveal the barcode identifier occurs based on date and time activation or geo-location activation (i.e., the privacy restricted unique barcode identifier is available to be accessed in the metadata of the smart contract for the pr-NFT only after a specific date/time or at a specific location indicating use, e.g., after which the metadata of the smart contract may restrict re-sale of the pr-NFT to avoid fraudulent ticket duplication).

In certain embodiments of the present invention, after the step of unmasking (and before authentication to access event), the event attendant will not be able to resell the pr-NFT secure ticket, e.g., in order to prevent duplicates and fraud.

In certain embodiments of the present invention, there will be a small window of time where the barcode identifier may be unmasked, e.g., when the gates open until when the gates close. In certain embodiments, during that time the event attendant will not be able to resell the pr-NFT secure ticket, e.g., in order to prevent duplicates and fraud.

v. Authenticating pr-NFT in Smart Contract to Authorize Access to Event

The methods of secure ticketing for an event host to issue a plurality of privacy restricted non-fungible tokens (pr-NFT) comprise the step of authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred. After being unmasked, the unique barcode identifier may be scanned, e.g., by a scanning tool. The step of scanning, initiates an analysis of the corresponding smart contract metadata to ensure the status information in the smart contract reflects that no prior scanning of said revealed barcode identifier has occurred. If no prior scanning has occurred, the pr-NFT is confirmed as an authentic secure ticket for an event.

In certain embodiments of the invention, the scanning tool may comprise a direct interface with the smart contract for the pr-NFT.

vi. Authorizing Access to Event

The methods of secure ticketing for an event host to issue a plurality of privacy restricted non-fungible tokens (pr-NFT) comprise the step of authorizing access to the event. Moreover, after the pr-NFT is confirmed as an authentic secure ticket for an event, the event attendant access to the event is authorized. This may be reflected on the scanning device or as part of the unmasked pr-NFT itself, e.g., on the device interfacing with the wallet holding the pr-NFT.

In certain embodiments of the invention, this authorization is displayed on the device of the event attendant.

In certain embodiments of the invention, this authorization is displayed on the scanning tool.

vii. Updating Metadata of Smart Contract After Authentication

The methods of secure ticketing for an event host to issue a plurality of privacy restricted non-fungible tokens (pr-NFT) comprise the step of updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred.

The authentication after scanning further triggers the revelation of the digital artwork, stored in the metadata of the pr-NFT, to the event attendant, in a "scan-to-reveal" process, which, in certain embodiments, updates the image of the pr-NFT to be the digital artwork, e.g., a collectible. In certain embodiments, the step sends a request to the associated smart contract to change the metadata from a barcode identifier to the digital artwork. In particular embodiments, this step removes the barcode data and image, and replaces it with traits and a new image of the digital artwork.

Further, upon authentication, the smart contract metadata of the pr-NFT is updated to reflect the status of the of the pr-NFT that scanning of the revealed barcode identifier and authentication of the pr-NFT have occurred, at which point, the barcode identifier will no longer be useful to gain access to the event. Therefore, no barcode identifiers will be able to be scanned more than once, e.g., by an official event scanner, to gain access to the event. Once the event concludes, event attendants will be able to resell the digital art, e.g., collectible; as it will not have a usable barcode associated with it anymore.

In certain embodiments of the present invention, the step of updating the metadata of the smart contract after authentication has occurred further triggers the distribution an additional item of value to the authorized pr-NFT in accordance with a probability calculation, e.g., algorithm (e.g., artwork, a real-world asset or real-world experience). Such real world experiences can include, for example, back stage passes or VIP areas. Such real-world assets can include, for example, the instrument used in the concert or an article of clothing of the performer(s). The probability algorithm may be implemented in a variety of ways, for example, calculating a percentage chance based on number of tickets/pr-NFTs authorized, e.g., on the day of the event.

viii. Social Media Networks

Another embodiment of the present invention further provides a method for sharing secure ticketing information, i.e., to others. In certain embodiments of the present invention, the event attendant may designate certain information about the secure tickets of the present invention shareable, i.e., offer access to a designated person or group of people. In certain embodiments of the present invention, the event host may designate certain information about the secure tickets of the present invention shareable, i.e., offer access to a designated person or group of people. In particular embodiments, the shareable information serves as the core basis of a social media network, including, for example, the ability to view profiles, follow profiles, interact with profiles (i.e., show approval, disapproval, or provide comment), and communicate directly either through regular messaging or instant messaging. In specific embodiments, one or more third parties may further interact with the shareable information.

In certain embodiments, the access offered by the event attendant or event host may be restricted to an itemized level of person (or group of persons), including for example, a friend, i.e., an authorized/accepted person (or a friend circle, i.e., an authorized/accepted group of persons). In certain embodiments, the access offered by the event attendant or event host may be unrestricted, i.e., available to the general public without requiring special access privileges.

In certain embodiments, the shareable information may include, but is not limited to, user identities/profiles/information, past ticketed events (i.e., an history of one or more events), upcoming ticketed events, music preferences (i.e., likes and dislikes), event interests, NFT images (e.g., with read-only access), comments on their own profile, and/or comments on others' profiles.

In certain embodiments of the present invention, the shareable information, e.g., social media network, may be hosted on the blockchain network (i.e., the same blockchain network as the secure ticketing platform). Such embodiment, without wishing to be bound by theory, takes advantage of the blockchain specific community aspects include the distributed digital ledger whereby individuals can see transactions occurring on the blockchain, open source protocols whereby individuals can contribute to the development of the blockchain, and peer-to-peer transactions whereby individuals can transact directly with one another without intermediaries.

In certain embodiments of the present invention, the shareable information, e.g., social media network, may be hosted on a server that is not on the blockchain network. In certain embodiments, the shareable information may be hosted on a separate blockchain network, e.g., a publically accessible blockchain network. In certain alternate embodiments, the shareable information may be hosted on a server that is not part of a blockchain network.

B. Secure Ticketing API of the Present Invention

The methods of the present invention may be utilized and implemented as an API. As such another embodiment of the present invention provides a secure ticketing API of a de-centralized application for an event host to issue a plurality of privacy restricted non-fungible tokens (pr-NFT) suitable for interfacing with a plurality of device nodes structured as a blockchain network, wherein the application comprises a machine-readable medium having instructions stored thereon for execution by a processor to perform a method comprising the steps of:

accessing a plurality of device nodes structured as a blockchain network;

creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;

transferring the pr-NFT to a blockchain wallet of the event attendant (e.g., from a blockchain wallet of the event host);

unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);

authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;

authorizing access to the event; and updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

In certain embodiments of the secure ticketing API of the present invention, the method further comprises the step of managing more than one smart contract (e.g., for multiple events and/or multiple event hosts).

In certain embodiments of the present invention, the machine-readable medium comprising the API is on a de-centralized device not on the blockchain network.

In certain embodiments of the present invention, the API operates through a graphic user interface.

In certain embodiments of the present invention, the API further interfaces with an event scanner. In certain embodiments, the API interfaces with the event scanner through a graphical user interface on the event scanner. In particular embodiments, the event scanner is a scanning tool/apparatus that includes a camera with ability to read a barcode and interface with the API.

In certain embodiments of the secure ticketing API of the present invention, the method further comprises the step of sharing secure ticketing information. In certain embodiments, the machine-readable medium having instructions stored thereon for execution by a processor to perform a method further comprises the step of the event attendant designating information about the secure tickets of the present invention shareable, i.e., offering access to a designated person or group of people. In certain embodiments, the machine-readable medium having instructions stored thereon for execution by a processor to perform a method further comprises the step of the event host designating information about the secure tickets of the present invention shareable, i.e., offering access to a designated person or group of people.

C. Secure Ticketing Platform of the Present Invention

The methods and APIs of the present invention may serve as components of and be implemented as a secure ticketing platform, including additional components such as, the blockchain network, one or more blockchain wallets, and/or a scanning tool/apparatus. As such, another embodiment of the present invention is directed to a secure ticketing platform for an event host to issue a plurality of privacy restricted non-fungible tokens (pr-NFT) comprising:

a de-centralized application with an API suitable for interfacing with a plurality of device nodes structured as a blockchain network, wherein the application comprises a machine-readable medium having instructions stored thereon for execution by a processor to perform a method comprising the steps of:

accessing a plurality of device nodes structured as a blockchain network;

creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;

transferring the pr-NFT to a blockchain wallet of the event attendant (e.g., from a blockchain wallet of the event host);

unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);

authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;

authorizing access to the event; and updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event. In certain embodiments, the secure ticketing platform further comprises a blockchain wallet of an event host. In certain embodiments, the secure ticketing platform further comprises a blockchain wallet of an event attendant.

Another embodiment of the present invention is directed to a secure ticketing platform for an event host to issue a plurality of privacy restricted non-fungible tokens (pr-NFT) comprising:

a blockchain wallet of an event host;

a blockchain wallet of an event attendant;

a de-centralized application with an API suitable for interfacing with a plurality of device nodes structured as a blockchain network, wherein the application comprises a machine-readable medium having instructions stored thereon for execution by a processor to perform a method comprising the steps of:

accessing a plurality of device nodes structured as a blockchain network;

creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;

transferring the pr-NFT to the blockchain wallet of the event attendant (e.g., from a blockchain wallet of the event host);

unmasking the privacy restricted unique barcode identifier of the pr-NFT at the event to reveal the barcode identifier by extracting the assigned unique barcode identifier from the metadata and displaying the assigned unique barcode identifier to the event attendant (e.g., in the blockchain wallet of the event attendant);

authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;

authorizing access to the event; and updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

In certain embodiments of the secure ticketing platform of the present invention, the method further comprises the step of managing more than one smart contract (e.g., for multiple events and/or multiple event hosts).

In certain embodiments of the secure ticketing platform of the present invention, the machine-readable medium comprising the API is on a de-centralized device not on the blockchain network.

In certain embodiments of the secure ticketing platform of the present invention, the API operates through a graphic user interface.

In certain embodiments of the secure ticketing platform of the present invention, the API further interfaces with an event scanner. In certain embodiments, the API interfaces with the event scanner through a graphical user interface on the event scanner.

In certain embodiments of the present invention, the secure ticketing platform further comprises an event scanner. In certain embodiments, the event scanner is a scanning tool/apparatus that includes a camera with ability to read a barcode and interface with the API.

In certain embodiments of the present invention, the secure ticketing platform further comprises a blockchain network of device nodes, e.g., servers, computers, drives.

i. Social Media Networks

In certain embodiments of the secure ticketing platform of the present invention, the method further comprises the step of sharing secure ticketing information. In certain embodiments, the machine-readable medium having instructions stored thereon for execution by a processor to perform a method further comprises the step of the event attendant designating information about the secure tickets of the present invention shareable, i.e., offering access to a designated person or group of people. In certain embodiments, the machine-readable medium having instructions stored thereon for execution by a processor to perform a method further comprises the step of the event host designating information about the secure tickets of the present invention shareable, i.e., offering access to a designated person or group of people. In particular embodiments, the shareable information serves as the core basis of a social media network, including, for example, the ability to view profiles, follow profiles, interact with profiles (i.e., show approval, disapproval, or provide comment), and communicate directly either through regular messaging or instant messaging. In specific embodiments, one or more third parties may further interact with the shareable information.

In certain embodiments, the access offered by the event attendant or event host may be restricted to an itemized level of person (or group of persons), including for example, a friend, i.e., an authorized/accepted person (or a friend circle, i.e., an authorized/accepted group of persons). In certain embodiments, the access offered by the event attendant or event host may be unrestricted, i.e., available to the general public without requiring special access privileges.

In certain embodiments, the shareable information may include, but is not limited to, user identities/profiles/information, past ticketed events (i.e., an history of one or more events), upcoming ticketed events, music preferences (i.e., likes and dislikes), event interests, NFT images (e.g., with read-only access), comments on their own profile, and/or comments on others' profiles.

In certain embodiments of the present invention, the shareable information, e.g., social media network, may be hosted on the blockchain network (i.e., the same blockchain network as the secure ticketing platform. Such embodiment, without wishing to be bound by theory, takes advantage of the blockchain specific community aspects include the distributed digital ledger whereby individuals can see transactions occurring on the blockchain, open source protocols whereby individuals can contribute to the development of the blockchain, and peer-to-peer transactions whereby individuals can transact directly with one another without intermediaries.

In certain embodiments of the present invention, the shareable information, e.g., social media network, may be hosted on a server that is not on the blockchain network. In certain embodiments, the shareable information may be hosted on a separate blockchain network, e.g., a publically accessible blockchain network. In certain alternate embodiments, the shareable information may be hosted on a server that is not part of a blockchain network.

EXEMPLIFICATION

Having thus described the invention in general terms, reference will now be made to exemplary embodiments, and the accompanying drawings of exemplary embodiments, which are not necessarily drawn to scale, and which are not intended to be limiting in any way.

In this respect, it is to be understood that the invention is not limited in its application to the details of construction and to the arrangements of the components set forth in the following description or illustrated in the Figure. The invention is capable of other embodiments and of being practiced and carried out in various ways. Also, it is to be understood that the phraseology and terminology employed herein are for the purpose of description and should not be regarded as limiting.

Example 1

Exemplary Embodiment: Secure Ticketing Platform

Figure 1:
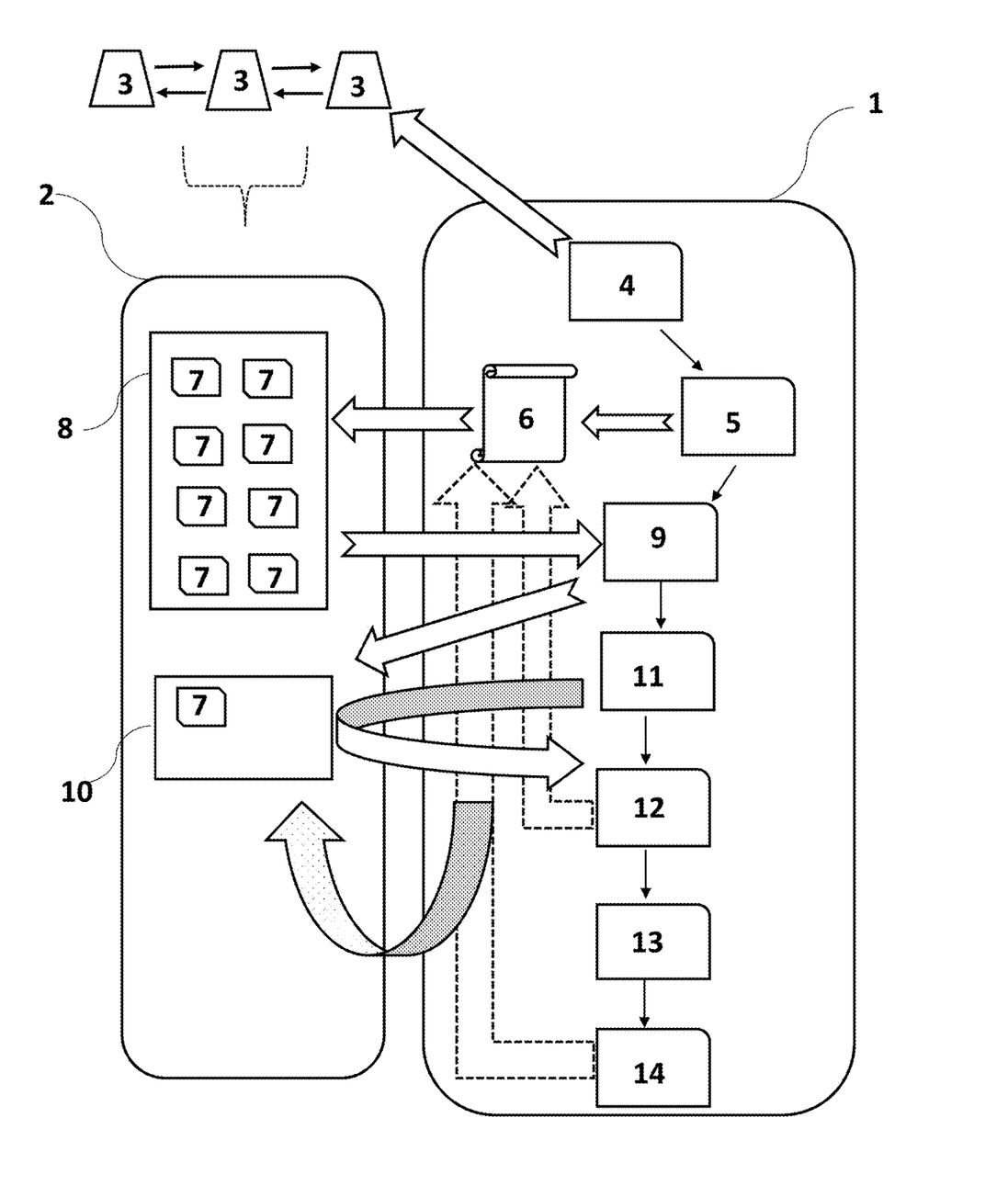
FIG. 1 depicts a schematic view of the architecture of certain embodiments of the secure ticketing platform present invention.

An exemplary embodiment of the secure ticketing platforms of the present invention is described herein below. In this respect, FIG. 1 depicts a schematic view of the architecture of certain embodiments of the secure ticketing platform present invention.

The secure ticketing platforms incorporate the methods of secure ticketing and the secure ticketing APIs of the present invention, and also serve to automate the management of multiple smart contracts.

Implementation:

In this exemplary embodiment, web3.py in Python was utilized to create the automation system of the present invention, e.g., for managing ERC-721 smart contracts. The platform is hosted on a server and is programmed to execute various transactions, including token transfers, token creation, token updates, changing metadata, and executing customized functions. The automation platform was deployed on Ethereum testnets to test its functionality and ensure it met all desired conditions. Once testing on the testnets was successfully completed, the platform was deployed on the main Ethereum network (mainnet).

A secure ticketing platform for an event host to issue a plurality of privacy restricted non-fungible tokens (pr-NFT) is shown in FIG. 1. The de-centralized application with API 1 suitable for interfacing with a plurality of device nodes 3 structured as an Ethereum blockchain network 2, wherein the application comprises a machine-readable medium having instructions stored thereon for execution by a processor to perform a method comprising:

The step of accessing 4 a plurality of device nodes 3 structured as an Ethereum blockchain network 2;

The step of creating 5 an ERC-721 smart contract 6 for an event to facilitate the minting and validation of one or more privacy restricted non-fungible tokens (pr-NFT) 7, wherein each minted pr-NFT is assigned a privacy restricted unique barcode identifier and digital artwork, in the metadata of the ERC-721 smart contract, and wherein the pr-NFT 7 serves as a ticket to attend the event and is held in the blockchain wallet of an event host 8;

The step of transferring 9 the pr-NFT 7 to the blockchain wallet of the event attendant 10;

The step of unmasking 11 the privacy restricted unique barcode identifier of the pr-NFT 7 at the event to reveal the barcode identifier by extracting the assigned unique barcode identifier from the metadata from ERC-721 smart contract 6 and displaying the assigned unique barcode identifier to the event attendant;

The step of authenticating 12 the pr-NFT 7 in the ERC-721 smart contract 6 to authorize access to the event upon (1) scanning the revealed barcode identifier and (2) ensuring the ERC-721 smart contract 6 metadata of the pr-NFT 7 reflects the status that no prior scanning of said revealed barcode identifier has occurred;

The step of authorizing 13 access to the event; and

The step of updating 14 the metadata of the ERC-721 smart contract 6 after authentication 12 has occurred to (1) reveal the digital artwork of the pr-NFT 7 to the event attendant and (2) to reflect the status in the ERC-721 smart contract 6 metadata of the pr-NFT 7 that scanning of the revealed barcode identifier and authentication 12 of the pr-NFT 7 have occurred, such that the plurality of the pr-NFTs 7 serve as secure tickets for the event.

In certain embodiments, continuous maintenance is performed to monitor the performance of the platforms and/or the APIs of the present invention and to make any necessary updates or improvements to ensure it continues to operate effectively across a variety of different events. This includes monitoring the transactions executed by the platform and ensuring their accuracy, reliability, and security.

Incorporation By Reference

The entire contents of all patents, published patent applications and other references cited herein are hereby expressly incorporated herein in their entireties by reference.

Equivalents

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. A secure ticketing platform for an event host to issue a plurality of privacy restricted non-fungible tokens (pr-NFT) comprising:

a blockchain wallet of an event host;

a blockchain wallet of an event attendant;

a de-centralized application with an API suitable for interfacing with a plurality of device nodes structured as a blockchain network, wherein the application comprises a machine-readable medium having instructions stored thereon for execution by a processor to perform a method comprising the steps of:

accessing a plurality of device nodes structured as a blockchain network;

creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;

transferring the pr-NFT to the blockchain wallet of the event attendant;

unmasking the privacy restricted unique barcode identifier of the pr-NFT at the event to reveal the barcode identifier by extracting the assigned unique barcode identifier from the metadata and displaying the assigned unique barcode identifier to the event attendant;

authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;

authorizing access to the event; and updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

2. The secure ticketing platform of claim 1, wherein the method further comprises the step of managing more than one smart contract.

3. The secure ticketing platform of claim 1, wherein the privacy restricted unique barcode identifier is a customized web3 barcode.

4. The secure ticketing platform of claim 1, wherein the privacy restricted unique barcode identifier is masked as a graphic image until unmasked.

5. The secure ticketing platform of claim 1, wherein the step of unmasking the privacy restricted unique barcode identifier of the pr-NFT to reveal the barcode identifier occurs based on date and time activation or geo-location activation.

6. The secure ticketing platform of claim 1, wherein the step of creating a smart contract for an event occurs upon payment from a blockchain wallet of the event host.

7. The secure ticketing platform of claim 1, wherein the event host creates or provides the digital artwork.

8. The secure ticketing platform of claim 1, wherein the digital artwork is a unique digital artwork.

9. The secure ticketing platform of claim 1, wherein the step of updating the metadata of the smart contract after authentication has occurred further triggers the distribution an additional item of value to the authorized pr-NFT in accordance with a probability calculation.

10. The secure ticketing platform of claim 1, wherein the smart contract is an ERC-721 smart contract.

11. The secure ticketing platform of claim 1, wherein the step of the transferring the pr-NFT to the blockchain wallet of the event attendant is based on a purchase of a ticket from the blockchain wallet of an event host.

12. The secure ticketing platform of claim 1, wherein the machine-readable medium is on a de-centralized device not on the blockchain network.

13. The secure ticketing platform of claim 1, wherein the pr-NFT may be transferred to another event attendant.

14. The secure ticketing platform of claim 13, wherein the price for the transfer may be limited by the event host.

15. The secure ticketing platform of claim 1, further comprising an event scanner.

16. The secure ticketing platform of claim 1, further comprising a blockchain network of device nodes.

17. The secure ticketing platform of claim 1, wherein the API operates through a graphic user interface.

18. A secure ticketing API of a de-centralized application for an event host to issue a plurality of privacy restricted non-fungible tokens (pr-NFT) suitable for interfacing with a plurality of device nodes structured as a blockchain network, wherein the application comprises a machine-readable medium having instructions stored thereon for execution by a processor to perform a method comprising the steps of:

accessing a plurality of device nodes structured as a blockchain network;

creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;

transferring the pr-NFT to a blockchain wallet of the event attendant;

unmasking the privacy restricted unique barcode identifier of the pr-NFT at the event to reveal the barcode identifier by extracting the assigned unique barcode identifier from the metadata and displaying the assigned unique barcode identifier to the event attendant;

authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;

authorizing access to the event; and updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

19. The secure ticketing API of claim 18, wherein the API further interfaces with an event scanner.

20. The secure ticketing API of claim 19, wherein the API interfaces with the event scanner through a graphical user interface on the event scanner.

21. A method of secure ticketing for an event host to issue a plurality of privacy restricted non-fungible tokens (pr-NFT) comprising the steps of:

accessing a plurality of device nodes structured as a blockchain network;

creating a smart contract for an event to facilitate the minting and validation of one or more privacy restricted non-fungible tokens (pr-NFT), wherein each minted pr-NFT is assigned a privacy restricted unique barcode identifier and digital artwork, in the metadata of the smart contract, and wherein the pr-NFT serves as a ticket to attend the event;

transferring the pr-NFT to a blockchain wallet of the event attendant;

unmasking the privacy restricted unique barcode identifier of the pr-NFT at the event to reveal the barcode identifier by extracting the assigned unique barcode identifier from the metadata and displaying the assigned unique barcode identifier to the event attendant;

authenticating the pr-NFT in the smart contract to authorize access to the event upon (1) scanning the revealed barcode identifier and (2) ensuring the smart contract metadata of the pr-NFT reflects the status that no prior scanning of said revealed barcode identifier has occurred;

authorizing access to the event; and updating the metadata of the smart contract after authentication has occurred to (1) reveal the digital artwork of the pr-NFT to the event attendant and (2) to reflect the status in the smart contract metadata of the pr-NFT that scanning of the revealed barcode identifier and authentication of the pr-NFT have occurred, such that the plurality of the pr-NFTs serve as secure tickets for the event.

* * * * *